United States Patent [19]
Gordon et al.

[11] 4,029,545
[45] June 14, 1977

[54] NUCLEAR FUEL ELEMENTS HAVING A COMPOSITE CLADDING

[75] Inventors: Gerald M. Gordon, Fremont; Robert L. Cowan, II, Livermore, both of Canada

[73] Assignee: General Electric Company, San Jose, Calif.

[22] Filed: Nov. 11, 1974

[21] Appl. No.: 522,770

[52] U.S. Cl. .................. 176/82; 176/68; 176/78

[51] Int. Cl.$^2$ ......................... G21C 3/20

[58] Field of Search .......... 176/68, 82, 91 R, 91 S; 29/194, 196.2, 196.6, 198

[56] References Cited

UNITED STATES PATENTS

| | | | |
|---|---|---|---|
| 2,854,737 | 10/1958 | Gray | 176/91 R |
| 2,854,738 | 10/1958 | Gray | 176/91 R |
| 2,928,168 | 3/1960 | Gray | 176/91 R |
| 3,145,150 | 8/1964 | Gylfe | 176/82 |
| 3,184,393 | 5/1965 | Blomey et al. | 176/91 R |
| 3,262,858 | 7/1966 | Gittus | 176/82 |
| 3,291,700 | 12/1966 | Brossa et al. | 176/82 |
| 3,427,222 | 2/1969 | Biancheria et al. | 176/91 R |
| 3,466,226 | 9/1969 | Lass | 176/68 |
| 3,850,584 | 11/1974 | Bohm et al. | 29/194 |

FOREIGN PATENTS OR APPLICATIONS

| | | | |
|---|---|---|---|
| 933,500 | 8/1963 | United Kingdom | 176/91 R |

Primary Examiner—Samuel W. Engle
Assistant Examiner—S. A. Cangialosi
Attorney, Agent, or Firm—Ivor J. James, Jr.; Sam E. Laub; Samuel E. Turner

[57] ABSTRACT

An improved nuclear fuel element is disclosed for use in the core of nuclear reactors. The improved nuclear fuel has a composite cladding container comprising an outer layer having two coatings on the inside surface with the first coating on the outer layer being a diffusion barrier and the second coating on the first coating being a metal layer. The diffusion barrier is comprised of chromium or a chromium alloy, and the metal layer is selected from the group consisting of copper, nickel, iron and alloys thereof. The nuclear fuel element comprises a container of the elongated composite cladding, a central core of a body of nuclear fuel material disposed in and partially filling the container and forming an internal cavity in the container, an enclosure integrally secured and sealed at each end of said container and a nuclear fuel material retaining means positioned in the cavity. The metal layer and the diffusion barrier of the composite cladding prevent perforations or failures in the outer layer of the cladding from stress corrosion cracking or from fuel pellet-cladding interaction or both. The outer layer of the composite cladding is selected from conventional cladding materials and preferably is a zirconium alloy.

12 Claims, 2 Drawing Figures

NUCLEAR FUEL ELEMENTS HAVING A COMPOSITE CLADDING

BACKGROUND OF THE INVENTION

This invention relates broadly to an improvement in nuclear fuel elements for use in the core of nuclear fission reactors, and more particularly to an improved nuclear fuel element having a composite cladding container having an outer layer and two coatings on the inside surface of the outer layer.

Nuclear reactors are presently being designed, constructed and operated in which the nuclear fuel is contained in fuel elements which can have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves several purposes and two primary purposes are: first, to prevent contact and chemical reactions between the nuclear fuel and the coolant or the moderator if a moderator is present, or both if both the coolant and the moderator ar present; and second, to prevent the radioactive fission products, some of which are gases, from being released from the fuel into the coolant or the moderator or both if both the coolant and the moderator are present. Common cladding materials are stainless steel, aluminum and its alloys, zirconium and its alloys niobium (columbium), certain magnesium alloys, and others. The failure of the cladding, i.e., a loss of the leak tightness, can contaminate the coolant or moderator and the associated systems with radioactive long-lived products to a degree which interferes with plant operation.

Problems have been encountered in the manufacture and in the operation of nuclear fuel elements which employ certain metals and alloys as the clad material due to mechanical or chemical reactions of these cladding materials under certain circumstances. Zirconium and its alloys, under normal circumstances, are excellent nuclear fuel claddings since they have low neutron absorption cross sections and at temperatures below about 750° F (about 398° C) are strong, ductile, extremely stable and non-reactive in the presence of demineralized water or steam which are commonly used as reactor coolants and moderators.

However, fuel element performance has revealed a problem with the brittle splitting of the cladding due to the combined interactions between the nuclear fuel, the cladding and the fission products produced during nuclear fission reactions. It has been discovered that this undesirable performance is promoted by localized mechanical stresses due to fuel cladding differential expansion (stresses in the cladding are localized at cracks in the nuclear fuel). Corrosive fission products are released from the nuclear fuel and are present at the intersection of the fuel cracks with the cladding surface. Fission products are created in the nuclear fuel during the fission chain reaction during operation of a nuclear reactor. The localized stress is exaggerated by high friction between the fuel and the cladding.

Within the confines of a sealed fuel element, hydrogen gas can be generated by the slow reaction between the cladding and the residual water inside the cladding may build up to levels which under certain conditions can result in localized hydriding of the cladding with concurrent local deterioration in the mechanical properties of the cladding. The cladding is also adversely affected by such gases as oxygen, nitrogen, carbon monoxide and carbon dioxide over a wide range of temperatures.

The zirconium cladding of a nuclear fuel element is exposed to one or more of the gases listed above and fission products during irradiation in a nuclear reactor and this occurs in spite of the fact that these gases and fission product elements may not be present in the reactor coolant or moderator, and further may have been excluded as far as possible from the ambient atmosphere during manufacture of the cladding and the fuel element. Sintered refractory and ceramic compositions, such as uranium dioxide and other compositions used as nuclear fuel, release measurable quantities of the aforementioned gases and fission products upon heating, such as during fuel element manufacture and further release fission products during irradiation. Particulate refractory and ceramic compositions, such as uranium dioxide powder and other powders used as nuclear fuel, have been known to release even larger quantities of the aforementioned gases during irradiation. These released gases are capable of reacting with the zirconium cladding containing the nuclear fuel.

This in light of the foregoing, it has been found desirable to minimize attack of the cladding from water, water vapor and other gases, especially hydrogen, reactive with the cladding from inside the fuel element throughout the time the fuel element is used in the operation of nuclear power plants. One such approach has been to find materials which will chemically react rapidly with the water, water vapor and other gases to eliminate these from the interior of the cladding, and such materials are called getters.

Another approach has been to coat the nuclear fuel material with a ceramic to prevent moisture coming in contact with the nuclear fuel material as disclosed in U.S. Pat. No. 3,108,936. U.S. Pat. No. 3,085,059 presents a fuel element including a metal casing containing one or more pellets of fissionable ceramic material and a layer of vitreous material bonded to the ceramic pellets so that the layer is between the casing and the nuclear fuel to assure uniformly good heat conduction from the pellets to the casing. U.S. Pat. No. 2,873,238 presents jacketed fissionable slugs of uraium canned in a metal case in which the protective jackets or coverings for the slugs are a zinc-aluminum bonding layer. U.S. Pat. No. 2,849,387 discloses a jacketed fissionable body comprising a plurality of open-ended jacketed body sections of nuclear fuel which have been dipped into a molten bath of a bonding material giving an effective thermally conductive bond between the uranium body sections and the container (or cladding). The coating is disclosed as any metal alloy having good thermal conduction properties with examples including aluminum-silicon and zinc-aluminum alloys. Japanese Patent Publication No. SHO 47-46559dated Nov. 24, 1972, discloses consolidating discrete nuclear fuel particles into a carbon-containing matrix fuel composite by coating the fuel particles with a high density, smooth carbon-containing coating around the pellets. Still another coating disclosure is Japanese Patent Publication No. SHO 47-14200 in which the coating of one of two groups of pellets is with a layer of silicon carbide and the other group is coated with a layer of pyrocarbon or metal carbide.

The coating of a nuclear fuel material introduces reliability problems in that achieving uniform coatings free of faults is difficult. Further, the deterioration of the coating can introduce problems with the long-lived performance of the nuclear fuel material.

U.S. Pat. application Ser. No. 330,152 filed Feb. 6, 1973 discloses a method for preventing corrosion of nuclear fuel cladding consisting of the addition of a metal such as niobium to the fuel. The additive can be in the form of a powder, provided the subsequent fuel processing operation does not oxidize the metal, or incorporated into the fuel element as wires, sheets or other forms in, around, or between fuel pellets.

Document GEAP-4555 dated Feb. 1964 discloses a composite cladding of a zirconium alloy with an inner lining of stainless steel metallurgically bonded to the zirconium alloy, and the composite cladding is fabricated by use of extrusion of a hollow billet of the zirconium alloy having an inner lining of stainless steel. This cladding has the disadvantage that the stainless steel develops brittle phases, and the stainless steel layer involves a neutron absorption penalty of about ten to fifteen times the penalty for a zirconium alloy layer of the same thickness.

U.S. Pat. No. 3,502,549 discloses a method of protecting zirconium and its alloys by the electrolytic deposition of chrome to provide a composite material for nuclear reactors. A method for electrolytic deposition of copper on Zircaloy-2 surfaces and subsequent heat treatment for the purpose of obtaining surface diffusion of the electrolytically deposited metal is presented in *Energia Nucleare* Volume 11, number 9 (Sept. 1964) at pages 505–508. In *Stability and Compatibility of Hydrogen Barriers Applied to Zirconium Alloys* by F. Brossa et al (European Atomic Energy Community, Joint Nuclear Research Center, EUR 4098e 1969 ), methods of deposition of different coatings and their efficiency as hydrogen diffusion barriers are described along with an Al-Si coating as the most promising barrier against hydrogen diffusion. Methods for electroplating nickel on zirconium and zirconium tin alloys and heat treating these alloys to produce alloy-diffusion bonds are disclosed in *Electroplating on Zirconium and Zirconium-Tin* by W. C. Schickner et al (BMl-757, Techincal Information Service, 1952). U.S. Pat. No. 3,625,821 presents a fuel element for a nuclear reactor having a fuel cladding tube with the inner surface of the tube being coated with a retaining metal of low neutron capture cross section such as nickel and having finely dispersed particles of a burnable poison disposed therein. *Reactor Development Program Progress Report* of August, 1973 (ANL-RDP-19) discloses a chemical getter arrangement of a sacrificial layer of chromium on the inner surface of a stainless steel cladding.

Another approach has been to introduce a barrier between the nuclear fuel material and the cladding holding the nuclear fuel material as disclosed in U.S. Pat. No. 3,230,150 (copper foil), German Patent Publication DAS 1,238,115 (titanium layer), U.S. Pat. No. 3,212,988 (sheath of zirconium, aluminum or beryllium), U.S. Pat. No. 3,018,238 (barrier of crystalline carbon between the $UO_2$ and the zirconium cladding), and U.S. Pat. No. 3,088,893 (stainless steel foil). While the barrier concept proves promising, some of the foregoing references involve incompatible materials with either the nuclear fuel (e.g., carbon can combine with oxygen from the nuclear fuel), or the cladding (e.g., copper and other metals can react with the cladding, altering the properties of the cladding), or the nuclear fission reaction (e.g., by acting as neutron absorbers). None of the listed references disclose solutions to the recently discovered problem of localized chemical-mechanical interactions between the nuclear fuel and the cladding.

Further approaches to the barrier concept are disclosed in U.S. Pat. No. 3,969,186 issued July 13, 1976 (refractory metal such as molybdenum, tungsten, rhenium, niobium and alloys thereof in the form of a tube or foil of single or multiple layers or a coating on the internal surface of the cladding), and U.S. Pat. No. 3,925,151, issued Dec. 9, 1975 (liner of zirconium, niobium or alloys thereof between the nuclear fuel and the cladding with a coating of a high lubricity material between the liner and the cladding).

Accordingly, it has remained desirable to devleop nuclear fuel elements minimizing the problems discussed above.

SUMMARY OF THE INVENTION

A particularly effective nuclear fuel element for use in the core of a nucler reactor has a composite cladding container comprised of an outer layer having two coatings on the inside surface with the first coating on the outer layer being a diffusion barrier and the second coating on the first coating being a metal layer. The diffusion barrier is comprised of chromium or a chromiun alloy and the metal layer is selected from the group consisting of copper, nickel, iron and alloys of the foregoing. The diffusion barrier can be physically bonded or metallurgically bonded to the substrate and the metal layer can be physically bonded or metallurgically bonded to the diffusion barrier. The diffusion barrier prevents reaction at very elevated temperatures between the outer layer of the cladding and the metal layer, and the metal layer along with the diffusion barrier forms a shield for the outer layer against fission products and gaseous impurities from the nuclear fuel material held in the container during nuclear fission. The metal layer serves as a preferential reaction site for reaction with gaseous impurities of fission products present inside the nuclear fuel element and in this manner the metal layer, as well as the diffusion barrier, serves to protect the outer layers of the cladding form exposure to and attack by the volatile impurities or fission products. Methods of manufacturing the composite cladding are also presented including (a) sequentially electroplating the diffusion barrier and the metal layer on the outer layer and (b) sequentially electroplating the diffusion barrier and the metal layer on the outer layer and heating the outer layer, diffusion barrier and metal layer to produce diffusion and a metallurgical bond between the outer layer and the diffusion barrier and a metallurgical bond between the diffusion barrier and the metal layer. This invention has the striking advantage that the outer layer of the cladding is protected from contact with fission products, corrosive gases and the like by the metal layer and the diffusion barrier, and the metal layer and the diffusion barrier introduce negligible neutron capture penalties.

OBJECTS OF THE INVENTION

It is an object of this invention to provide a nuclear fuel element capable of operating in nuclear reactors for extended periods of time without the occurrence of splitting of the cladding, internal corrosion of the cladding, or other fuel failure problems.

It is another object of this invention to provide a nuclear fuel element with a composite cladding comprising an outer layer two coatings on the inside surface with the first coating being a diffusion barrier and the second coating being a metal layer with the diffusion barrier preventing the metal layer from reacting with the outer layer at very elevated temperatures such as during a loss of coolant accident.

Still another object of the invention is to provide a nuclear fuel element with a composite cladding comprising an outer layer two coatings on the inside surface with the first coating being a diffusion barrier and the second coating being a metal layer and the metal layer protects the outer layer and reacts with fission products and gaseous impurities.

Another object of this invention is to provide an economical process for producing a composite cladding for a nuclear fuel element using either electroplating alone or electroplating with a heating step.

The foregoing and other objects of this invention will become apparent to a person skilled in the art from reading the following specification and the appended claims with reference to the accompanying drawings described immediately hereinafter.

DESCRIPTION OF THE INVENTION

Figure 1:
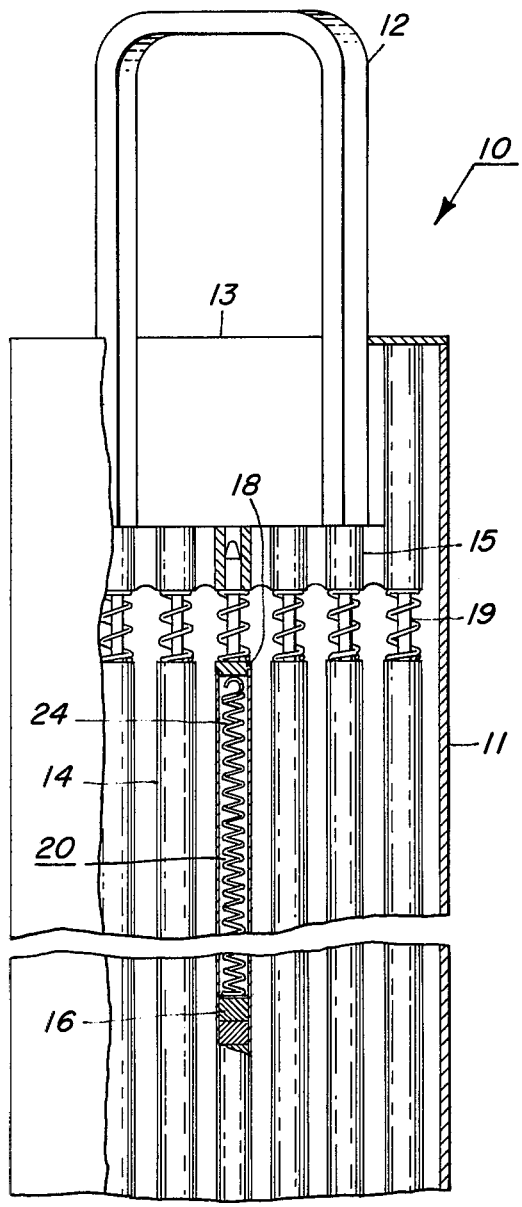
FIG. 1 is a partial cutaway sectional view of a nuclear fuel assembly containing nuclear fuel elements constructed according to the teaching of this invention.

Referring now more particularly to FIG. 1, there is shown a partially cutaway sectional view of a nuclear fuel assembly 10. This fuel assembly 10 consists of a tubular flow channel 11 of generally square cross section provided at its upper end with lifting bale 12 and at its lower end with a nose piece (not shown due to the lower portion of assembly 10 being omitted). The upper end of channel 11 is open at 13 and the lower end of the nose piece is provided with coolant flow openings. An array of fuel elements or rods 14 is enclosed in channel 11 and the supported therein by means of upper end plate 15 and a lower end plate (not shown due to the lower portion being omitted). The liquid coolant ordinarily enters through the openings in the lower end of the nose piece, passes upwardly around fuel elements 14, and discharges at upper outlet 13 in a partially vaporized condition for boiling reactors or in an unvaporized condition for pressurized reactors at an elevated temperature.

The nuclear fuel elements or rods 14 are sealed at their ends by means of end plugs 18 welded to the cladding 17, which may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical member is positioned within space 20 to provide restraint against the axial movement of the pellet column, especially during handling and transportation of the fuel element.

The fuel element is designed to provide an excellent thermal contact between the cladding and the fuel material, a minimum of parasitic neutron absorption and resistance to bowing and vibration which is occasionally caused by flow of the coolant at high velocity.

A nuclear fuel element or rod 14 is shown in a partial section in FIG. 1 constructed according to the teachings of this invention. The fuel element 14 includes a core or central cylindrical portion of nuclear fuel material 16, here shown as a plurality of fuel pellets of fissionable and/or fertile material positioned within a structural cladding or container 17. In some cases the fuel pellets may be of various shapes such as cylindrical pellets or spheres, and in other cases different fuel forms such as a particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide.

Figure 2:
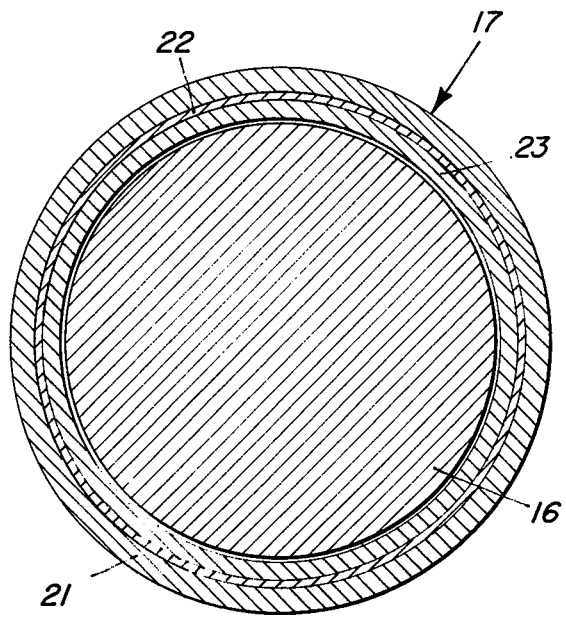
FIG. 2 is an enlarged cross sectional view of the nuclear fuel element in FIG. 2 illustrating the teaching of this invention.

Referring now to FIG. 2, the nuclear fuel material 16 forming the central core of the fuel element 14 is surrounded by a cladding 17 hereinafter in this description also referred to as a composite and as a composite cladding. The composite cladding 17 has an outer layer 21 selected from conventional cladding materials such as stainless steel and zirconium alloys and in a preferred embodiment of this invention the outer layer is a zirconium alloy such as Zircaloy-2. The outer layer has attached on the inside surface thereof a diffusion barrier 22 so that the diffusion barrier 22 so that the diffusion barrier 22 forms a shield preventing any diffusion of other species through the diffusion barrier 22 to the outer layer. The diffusion barrier 22 is preferably about 0.00005 to about 0.001 inch in thickness and is comprised of a low neutron penalty material selected from the group consisting of chromium and chromium alloys. The diffusion barrier serves as a secondary reaction site for gaseous impurities and fission products and protects the outer layer from contact and reaction with such gaseous impurities and fission products.

The diffusion barrier 22 has attached thereon a metal layer 23 so that the metal layer 23 covers the diffusion barrier 22 and also forms a shield for the outer layer against fission products and gaseous impurities emanating from the nuclear fuel material held in the container. The metal layer is about 0.0001 to about 0.002 inch in thickness and is comprised of a low neutron penalty metal selected from the group consisting of copper, nickel, iron and alloy thereof. The metal layer serves as a primary or preferential reaction site for gaseous impurities and fission products and also protects the outer layer from contact and reaction with such gaseous impurities and fission products.

The purity of the metal layer and the diffusion barrier is important from a neutron penalty aspect. The total impurities in the two layers are limited to a boron equivalent of 40 parts per million or less. In addition impurities should be kept at a level of less than 1 weight percent and perferably below 1000 parts per million to maintain resistance to irradiation hardening.

The composite cladding of the nuclear fuel element of this invention has the diffusion barrier bonded to the outer layer in a strong bond and the metal layer bonded to the diffusion barrier in a strong bond. When the composite cladding is heated in a diffusion step or cold worked the bond is metallurgical. Metallographical examination shows that there is significant physical bonding for the composite when the metal layer is electroplated. Tests to show the bond strength between the diffusion barrier and the outer layer show that the diffusion barrier remains firmly affixed when bent in the elastic region or when permanently strained to about 5%. Also, tests employing a metal stylus show that the underlying chromium layer cannot be scratched off, even in the as-plated condition.

It is discovered that the metal layer (iron, nickel or copper or alloys thereof) has been more resistant to the deleterious effects of radiation hardening and damage than zirconium alloys under the conditions found in commerical nuclear fission reactors, e.g. at temperatures of 500° F to 750° F. Thus, these materials have more ability to withstand plastic deformation without mechanical failure than zirconium and zirconium alloys under operating nuclear reactor conditions. Thus, these metals can deform plastically from pellet-induced stresses during power transients, relieving pellet-induced stresses. In addition, these metals will not rupture mechanically and thus will also shield the zirconium alloy outer layer from the delectrious action of fission products.

It has further been discovered that a metal layer of the order of about 0.0001 inch to about 0.002 inch bonded physically or metallurgically to the diffusion barrier which in turn is bonded to the outer layer of zirconium or a zirconium alloy provides stress reduction and chemical resistance sufficient to prevent nucleation failures in the outer layer of the cladding. The metal layer, as well as the diffusion barrier, provides significant chemical resistant to fission products and gases that may be present in the nuclear fuel element and prevents these fission products and gases from contacting the outer layer of the composite cladding protected by the metal barrier.

It has further been discovered that the composite clad will help to reduce the localization of stresses and strains in the cladding. Without a composite cladding, the zirconium alloy reacts with the oxide nuclear fuel to form $ZrO_2$ on the internal cladding surfaces. At internal cladding temperatures and in the presence of radiation, this oxide can sinter to the oxide fuel thus bonding the fuel to the clad. During fuel rod power changes this bonding can localize stresses and strains in the clad to high levels at crack locaticns in the $UO_2$. When the composite cladding is made with copper or nickel as the metal layer, the oxygen potential inside the fuel rod is such that the copper or nickel can not be oxidized, and thus bonding does not occur between the oxide nuclear fuel and the cladding. With iron as metal layer, the oxides or iron are just marginally for the oxygen potentials inside the fuel rod and a strong does not form. of the metals and alloys used in the metal layers herein will reduce the localization of stresses and strains in the cladding by having non-existent or weak bonding with the nuclear fuel.

It has further been discovered that because the metal layer does not oxidize to any appreciable extent, the stoichiometry of the $UO_2$ fuel can be stabilized. Without the metal layer, the zirconium or zirconium alloy will react with the oxide nuclear fuel forming $ZrO_2$, thus changing the stoichiometry of the oxide nuclear fuel.

The chemical state of various fission products is a very strong function of the oxide nuclear fuel stoichiometry. For example, at higher oxygen to uranium ratios, cesium forms a compound with the $UO_2$ fuel. At lower ratios, this compound is not stable and cesium can migrate to the lower temperature regions of the fuel rod (e.g., inner surface of the cladding). Cesium, either alone or in combination with other fission products, may then promote stress corrosion of the cladding. In a fuel rod with an uncoated cladding, even if the oxide nuclear fuel has a high initial oxygen to uranium ratio, the oxygen consumed by the oxidation of the zirconium alloy will lower this ratio, and cesium can be released to migrate to the cladding surface. With the present invention using a diffusion barrier and a metal layer, the ratio will remain nearly constant or change at a reduced rate. Thus, an oxide nuclear fuel with any desired stoichiometry can be used in the composite cladding with the expectation that this stoichiometry will remain constant or change with time at a much slower rate.

The composite cladding used in the nuclear fuel elements of this invention can be fabricated by any of the following methods.

In one method, the chromium is electroplated on the zirconium or zirconium alloy outer layer so that the metal layer is uniform on the outer layer. A layer of copper, nickel or iron is then electroplated on the chromium layer by the following process. The outer layer zirconium alloy is first activated by exposure to an agitated solution of the following composition: $NH_4FHF$—10to 20 gms/liter, $H_2SO_4$—0.75 to 2 gms/liter with the balance water to make 1 liter. The aformentioned bath should first be aged by exposure to a pickled zirconium or zirconium alloy for about 10 minutes. The chromium can then be electroplated by employing conventional acid plating bath techniques. One method that has worked well uses a bath of 283 gms/liter of $Cr_2O_3$ 2.83 gms/liter of $H_2SO_4$ with the balance $H_2O$ and applied at a temperature of 66° C at a current density of 50 amps/sq. ft. After the chromium layer has been applied, the composite may be outgassed in vacuum at 300–400° F for about 3 to 4 hours to remove hydrogen contamination from the electroplated metal. One or a combination of the metals of copper, nickel or iron is then electroplated on the chromium layer. One method that works well at this stage is to apply a nickel strike from an aqueous solution composed of 40 gms/liter of $NiCl_4 \cdot 6H_2O$ 36 gms/liter of HCl. The strike is applied from a room temperature solution at 50 amps/sq. ft. A nickel, iron or copper layer may then be applied to this strike using standard acid bath plating procedures. A copper strike may also be substituted for the nickel strike. The entire composite cladding may then be vacuum outgassed at 300–400° F for 3–4hours to remove hydrogen contamination.

In another method, the above electroplating method is followed by a diffusion bonding step to metallurgically bond the diffusion barrier to the outer layer and the metal layer to the diffusion barrier. An example of this treatment would be a 2–5hour treatment in vacuum at about 1350° to 1400° F.

The foregoing processes of fabricating the composite cladding of this invention gives economies over other processes used in fabricating cladding such as vapor deposition.

The invention includes a method of producing a nuclear fuel element comprising making a composite cladding container comprising an outer layer having two coatings on the inside surface with the first coating on the outer layer being a diffusion barrier and the second coating on the first coating being a metal layer, which container is open at one end, filling the composite cladding container with nuclear fuel material leaving a cavity at the open end, inserting a nuclear fuel material retaining means into the cavity, applying an end closure to the open end of the container leaving the cavity in communication with the nuclear fuel, and then bonding the enclosure to the container to form a tight seal therebetween.

The present invention offers several advantages promoting a long operating life for the nuclear fuel element including the reduction of hydriding of the cladding substrate, the minimization of localized stress on the outer layer cladding of the, the minimization of stress and strain corrosion on the outer layer of the, and the reduction of the probability of a splitting failure in the outer layer of the cladding. The invention further prevents expansion (or swelling) of the nuclear fuel into direct contact with the outer layer of the cladding, and this prevents or reduces localized stresses and strains on the outer layer of the, initiation or acceleration of stress corrosion of the outer layer of the cladding and bonding of the nuclear fuel to the cladding substrate.

An important property of the composite cladding of this invention is that the foregoing improvements are achieved with a negligible additional neutron penalty. Such a cladding is readily accepted in nuclear reactors since the cladding would have essentially no eutectic formation during a loss of cooling accident or an accident involving the dropping of a nuclear control rod. No liquid eutectic forms in the claddings of this invention because chromium does not form a eutectic phase with either zirconium, zirconium alloys, copper, nickel or iron at temperatures experienced in postulated loss of coolant accident conditions in water-cooled and moderated nuclear reactors. Further the composite cladding has a very small heat transfer penalty in that there is no thermal barrier to transfer of heat such as results in the situation where a separate foil or liner is inserted in a fuel element between the nuclear fuel and the cladding. Also the composite cladding of this invention is inspectable by conventional non-destructive testing methods during various stages of fabrication.

The metal layer of the composite cladding reacts rapidly with fission product iodine to form iodides and thus chemically remove a known stress corrosion agent for zirconium and zirconium alloys from contacting outer layer of the composite cladding. The metal layer of the composite cladding will resist radiation damage sufficiently at temperatures encountered by the cladding to have superior ductility and toughness properties to that of the zirconium or zirconium alloy.

The metal layer prevents the bonding between the nuclear fuel and the outer layer of the cladding and reduces localized stress and strains. The metal layer also maintains the initial stoichiometry of the nuclear fuel.

The diffusion barrier between the outer layer and the metal layer serves to prevent the metal of the metal layer from reacting with the zirconium to form a liquid phase during a loss of coolant accident when the temperature of the cladding is elevated.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A nuclear fuel element comprising (a) a central core of a body of nuclear fuel material selected from the group consisting of compounds of uranium, plutonium, thorium and mixtures thereof and (b) an elongated composite cladding container comprising an outer layer of a material selected from the group consisting of zirconium or a zirconium alloy having two coatings bonded on the inside surface with the first coating being an undeformed diffusion barrier of constant thickness selected from the group consisting of chromium and chromium alloys and the second coating being an undeformed metal layer of constant thickness selected from the group consisting of copper, nickel, iron and alloys thereof, said diffusion barrier being about 0.00005 to about 0.001 inch in thickness, said metal layer being about 0.0001 to about 0.002 inch in thicknes, each of said coatings having an impurity content of less than about 1 weight percent, and said cladding container enclosing said core so as to leave a gap between said core and said container during use in a nuclear reactor.

2. A nuclear fuel element of claim 1 which has in addition a cavity and a nuclear fuel material retaining means in the form of a helical member positioned in the cavity.

3. A nuclear fuel element of claim 1 in which the metal layer is copper.

4. A nuclear fuel element of claim 1 in which the metal layer is nickel,

5. A nuclear element of claim 1 in which the metal layer is iron.

6. A nuclear fuel element of claim 1 in which the outer layer is a zirconium alloy.

7. A nuclear element of claim 1 in which the diffusion barrier is chromium.

8. A nuclear fuel element of claim 1 in which the diffusion barrier is a chromium alloy.

9. A nuclear fuel element of claim 1 in which each of said coatings has an impurity content of less than about 1000 parts per million.

10. A nuclear fuel element of calim 1 in which the nuclear fuel material is comprised of uranium dioxide.

11. A nuclear fuel element of claim 1 in which the nuclear fuel material is a mixture comprising uranium dioxide and plutonium dioxide.

12. A nuclear fuel element which comprises an elongate composite cladding container of an outer layer of a material selected from the group consisting of zirconium or a zirconium alloy having two coatings bonded on the inside surface with the first coating on the outer layer being an undeformed diffusion barrier of constant thickness selected from the group consisting of chromium and chromium alloys and the second coating on the first coating being an undeformed metal layer of constant thickness selected from the group consisting of copper, nickel, iron and alloys thereof, said diffusion barrier being about 0.0005 to about 0.001 inch in thickness, said metal layer being about 0.0001 to about 0.002 inch in thickness each of said coatings having an impurity content of less than about one weight percent, a central core of a body of nuclear fuel material selected from the group consisting of compounds of uranium, plutonium, thorium and mixtures thereof disposed in and partially filling said container and forming an internal cavity in the container, an enclosure integrally secured and sealed at each end of said container, a nuclear fuel material retaining means positioned in the cavity, and said cladding container enclosing said core so as to leave a gap between said core and said container during use in a nuclear reactor.

* * * * *